United States Patent [19]

Hindagolla

[11] Patent Number: 4,963,189

[45] Date of Patent: Oct. 16, 1990

[54] WATERFAST INK FORMULATIONS WITH A NOVEL SERIES OF ANIONIC DYES CONTAINING TWO OR MORE CARBOXYL GROUPS

[75] Inventor: Suraj L. Hindagolla, Corvallis, Oreg.

[73] Assignee: Hewlett-Packard Company, Palo Alto, Calif.

[21] Appl. No.: 398,018

[22] Filed: Aug. 24, 1989

[51] Int. Cl.$^5$ .............................................. C09D 11/02
[52] U.S. Cl. ........................................ 106/22; 106/20; 534/836; 534/837; 534/824
[58] Field of Search .................... 106/20, 22; 534/836, 534/837, 824; 8/673

[56] References Cited

U.S. PATENT DOCUMENTS

| | | | |
|---|---|---|---|
| 4,626,284 | 12/1986 | Ohta et al. | 534/836 |
| 4,752,337 | 6/1988 | Kunde | 106/22 |

FOREIGN PATENT DOCUMENTS

| | | | |
|---|---|---|---|
| 0249127 | 12/1987 | European Pat. Off. | 106/22 |
| 151072 | 11/1980 | Japan | 106/22 |
| 176368 | 10/1984 | Japan | 106/22 |
| 63765 | 3/1988 | Japan | 106/22 |

*Primary Examiner*—William R. Dixon, Jr.
*Assistant Examiner*—Helene Klemanski

[57] ABSTRACT

Inks are provided comprising (a) a dye corresponding to the formula

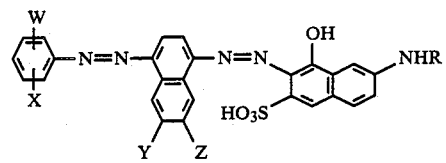

wherein
W is COOH,
X is H, or COOH,
Y is H, COOH, or $SO_3H$,
Z is H, COOH, or $SO_3H$, and
R is H, $CH_2COOH$, or $CH_2CH_2COOH$;

with the proviso that there are at least two COOH groups and that the number of COOH groups is equal to or greater than the number of $SO_3$ groups, and (b) a solvent which may be water or a mixture of water and a water-soluble organic solvent provide excellent waterfast prints on paper. The inks preferably have a pH from about 7 to about 9.5.

17 Claims, No Drawings

WATERFAST INK FORMULATIONS WITH A NOVEL SERIES OF ANIONIC DYES CONTAINING TWO OR MORE CARBOXYL GROUPS

TECHNICAL FIELD

This application relates to ink formulations for inkjet printers.

BACKGROUND ART

Thermal ink-jet printers operate by employing a plurality of resistor elements to expel droplets of ink through an associated plurality of nozzles. In particular, each resistor element, which is typically a pad of a resistive material measuring about 50 $\mu$m $\times$ 50 $\mu$m, is located in a chamber filled with ink supplied from a reservoir. A nozzle plate, comprising a plurality of nozzles or fine openings, with each nozzle associated with a resistor element, defines one side of the chamber. Upon energizing of a particular resistor element, a droplet of ink is expelled through the nozzle toward the print medium, whether paper, transparent film, or the like. The firing of ink droplets is typically under the control of a microprocessor, the signals of which are conveyed by electrical traces to the resistor elements, thereby forming alphanumeric and other characters on the print medium.

The tight tolerances of the nozzles (typically 40 to 50 $\mu$m diameter) require that the ink not clog the nozzles. Further, repeated firings of the resistor elements, which must withstand many millions of firings over the life of the ink cartridge to be commercially practical, can result in fouling of the resistor elements. This is unique to thermal ink-jet printers and is known as kogation.

The ink composition must be capable of interacting with the print medium, especially paper, to penetrate the paper without undue spreading and a subsequent decrease in print quality. Finally, the printed characters must dry rapidly and be waterfast and smear resistant.

Inks are known which possess one or more of the foregoing properties. However, few ink compositions are known that possess all the foregoing properties, since an improvement in one property often results in the degradation of another property. Thus, many inks used commercially represent a compromise in an attempt to achieve an ink evidencing at least an adequate response in each of the foregoing considerations. Accordingly, investigations continue into developing ink formulations which have improved properties and which do not elevate one property at the expense of the others.

DISCLOSURE OF THE INVENTION

The present invention is directed to inks that are particularly suitable for ink-jet printing over a large range of uncoated papers. The inks contain a dye which, in the free acid form, has the formula:

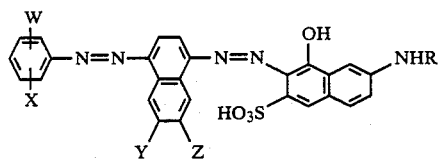

I wherein
W is COOH,
X is H or COOH,
Y is H, COOH, or SO$_3$H,
Z is H, COOH, or SO$_3$H, and
R is H, CH$_2$COOH, or CH$_2$CH$_2$COOH;
provided that there are at least two COOH groups and that the number of COOH groups is equal to or greater than the number of SO$_3$ groups.

It is preferred that there are from 2 to 4 COOH groups. It is also preferred that at least two, and more preferably at least three, of the COOH groups are attached directly to an aromatic carbon atom.

Where X is H, W may be in the ortho, meta, or para position with respect to the azo group, but is preferably in the para position. However, it is preferred that X is COOH and that the two COOH groups are in the 3,5-, 3,4-, or 2,5- position with respect to the azo group.

It is preferred that there are not more than two SO,H groups, i.e., that X and Y are not both SO$_3$H. It is also preferred that there are more COOH groups than SO$_3$H groups.

The inks of this invention comprise, by weight, from about 1% to about 10% dye, up to about 30% organic solvent, and the balance mostly water. A buffer is also employed to maintain the ink at a pH between about 7.5 and about 9.5. Other adjuncts commonly found in ink-jet inks, such as a biocide, may also be added to the inks.

BEST MODES FOR CARRYING OUT THE INVENTION

The dyes of the above formula can be prepared by diazotization of the corresponding amines, as indicated in Examples 1 and 2, below. Examples of suitable dyes for use in the inks of this invention correspond to formula I above wherein the substituents are as given in the following table:

| X | W | Y | Z | R |
|---|---|---|---|---|
| 3-COOH | 5-COOH | H | H | H |
| 3-COOH | 5-COOH | COOH | H | H |
| 3-COOH | 5-COOH | H | COOH | H |
| 3-COOH | 5-COOH | H | SO$_3$H | H |
| 3-COOH | 5-COOH | SO$_3$H | H | H |
| 3-COOH | 3-COOH | COOH | COOH | H |
| H | 4-COOH | H | COOH | H |
| 3-COOH | 4-COOH | H | H | CH$_2$COOH |
| 2-COOH | 5-COOH | H | SO$_3$H | CH$_2$COOH |
| 3-COOH | 5-COOH | SO$_3$H | H | CH$_2$COOH |
| 3-COOH | 5-COOH | H | H | CH$_2$CH$_2$COOH |
| 3-COOH | 5-COOH | H | COOH | CH$_2$COOH |

The dyes of the present invention are preferably used in the form of their salts, such as alkali metal (Na, K or Li) or amine. These are formed by mixing a dye which is in the acid form with a stoichiometric amount of the appropriate base in water. If one starts with the sodium salt of the dye and wishes to convert it to another salt, e.g., ammonium, the sodium form should be acidified to precipitate out the acid form. The acid form is then treated with the appropriate base, e.g., NH$_4$OH. It may be necessary to repeat the acid step and again mix with the base in order to remove all the sodium ions.

These salts are very soluble in water at a pH of about and above, especially from about pH 7.5 to about 9.5. However, the water-solubility drops sharply below about pH 7, and below pH 6, the dyes are virtually insoluble in water and aqueous media. A buffer, such as ammonium borate, may be used to maintain the ink at a pH above about 7.5.

The dyes in the form of their salts are dissolved in aqueous medium above about pH 7, preferably from about pH 7.5 to about pH 9.5, at concentrations up to about 20% by weight; preferred concentrations range from about 1% to about 10% by weight. Such a dye can be applied by any suitable technique, especially ink-jet printing, to a paper print medium. After application of the ink to the medium and evaporation of the solvent, the dye is at a pH determined by the surface of the medium. The natural pH of many paper media is such that the dye will be in environment from about pH 5 to about pH 7. Because the water-solubility of the dye is much lower below pH 7 and virtually zero at or below pH 6, the dye will be more resistant to removal from the substrate by washing, i.e., it will have high water-fastness. The water-fastness of the dyes on paper is increased if they are printed from an aqueous medium in a form containing a volatile cation such as ammonium or substituted ammonium salt (($CH_3$)$_4$N, ($CH_3$)$_3$NH, ($CH_3$)$_2$NH$_2$, or $CH_3NH_3$).

If the natural pH value of the paper surface is significantly above 6, this can be adjusted downward, by the addition to the ink of a salt of an acid with a volatile base, such as ammonia. When the ink dries, the base evaporates to leave the free acid, which will lower the pH of the paper surface in the region of the dye. To minimize damage to the paper, it is preferred to use a weak acid, such as acetic acid.

The inks preferably contain from about 0.5% to about 20%, more preferably from about 1% to about 10%, by weight of the dye based on the total weight of the ink.

Liquid media used for preparing the present inks include water and mixtures of water with various watersoluble organic solvents. When a water-soluble organic solvent is present, it preferably constitutes from about 2% to about 30% of the ink.

The water-soluble organic solvents include $C_1$-$C_4$ alkanols such as methanol, ethanol, n-propanol, isopropanol, n-butanol, sec-butanol, tert-butanol, isobutanol; amides such as formamide and dimethylacetamide; ketones or ketone alcohols such as acetone and diacetone alcohol; ethers such as tetrahydrofuran and dioxane; nitrogen-containing heterocyclic ketones such as 2-pyrrolidone, N-methyl-pyrrolid-2-one and 1,3-dimethylimidazolid-2-one; polyalkylene glycols such as polyethylene glycol and polypropylene glycol; alkylene glycols and thioglycols containing $C_2$-$C_6$ alkylene groups such as ethylene glycol, propylene glycol, butylene glycol, triethylene glycol; thiodiglycol, hexylene glycol, and diethylene glycol; other polyols such as glycerol and 1,2,6-hexanetriol; and lower alkyl ethers of polyhydric alcohols such as 2-methoxyethanol, 2-(2-methoxyethoxy)ethanol, 2-(2-ethoxyethoxy)ethanol, 2-methoxy-2-ethoxy-2-ethoxyethanol, 2-[2-(2-methoxyethoxy)ethoxy]ethanol, and 22-(2-ethoxyethoxy)ethoxy]ethanol.

Preferred water-soluble organic solvents among these are glycols and glycol ethers, such as ethylene glycol, diethylene glycol, triethylene glycol and 2-methoxy-2-ethoxy-2-ethoxyethanol; polyethylene glycols with molecular weights up to 500; and heterocyclic ketones such as 2-pyrrolidone, N-methylpyrrolid-2-one and 1,3-dimethylimidazo-lid-2-one. Preferred specific solvent mixtures are a binary mixture of water and diethylene glycol and a ternary mixture of water, diethylene glycol and N-methyl-pyrrolid-2-one.

The inks are preferably applied to a paper medium by means of a thermal ink-jet.

The preparation of the dyes to be used in the claimed inks is illustrated by the following examples in which all parts and percentages are by weight unless otherwise indicated.

EXAMPLE 1

Stage 1:

1-Amino-4-(3,5-dicarboxyphenylazo)-7-sulphonaphthalene

5-Aminoisophthalic acid (18.1 g, 0.1M) was stirred in water (150ml) at room temperature and 2N NaOH was added to form a solution at pH 8.0. 2N NaNO, solution (50ml) was added and the mixture stirred to homogenize. The solution was added gradually to a mixture of ice/water (150 ml) and 6% HCl (50ml) at 5° C. and the resulting suspension stirred for ½ hour at 5° C. Sulphanilic acid solution (10%) was added in order to remove excess nitrous acid.

1,7-Cleves acid (22.3 g, 0.1M) was dissolved in water (150 ml) and 32% NaOH solution at pH 8.5. Na,CO, (10 g) was added and the solution cooled to 10° C. To this solution was added the above diazo suspension at pH 8.0 to pH 9.0 by the addition of $NaCO_3$ solution (20%). The orange solution was stirred for 1 hour at 10° C.

10% NaCl (w/v) was added followed by 36% HCl to pH 5.0. The precipitated dye was collected by filtration and washed with NaCl solution (10%, 200 ml).

Stage 2:

The paste from Stage 1 (0.1M) was dissolved in water (100 ml) and 2N NaOH was added to bring the solution to pH 9.0. 2N $NaNO_2$ solution (50 ml) was added and the mixture stirred 3 minutes. The solution was added gradually to a mixture of ice/water (150 ml) and 36% HCl (50 ml) at 5° C. using rapid agitation. The resulting suspension was stirred 1 hour at 5° C. Sulphanilic acid solution (10%) was added to remove excess nitrous acid.

Gamma acid (23.9 g, 0.1M) was dissolved in water (150ml) and 2N NaOH solutions was added to bring the solution to pH 9.0. Na,CO, (10 g) was added and the solution cooled to 10° C. To this was added the above diazo suspension, while holding the pH at 8.0 to pH 9.0 with 20% $Na_2CO_3$ solution. The solution was stirred for 1 hour at 10° C. and the pH adjusted to 5.5 by the addition of glacial acetic acid.

The precipitated dye was collected by filtration and washed with dilute acetic acid solution (5%). The paste was redissolved in water (150 ml) and 2N NaOH was added to bring the solution to pH 9.0. The solution was heated to 50° C. and NaCl (15% w/v) was added and the precipitated dye collected by filtration and washed with 10% NaCl solution (100 ml). The product was 1-hydroxy-2-(4-[3,5-dicarboxyphe-nylazo]-7-sulphonaphth-l-ylazo)-3-sulpho-7-aminonaphthalene.

EXAMPLE 2

Stage 1:

1-Amino-4-(3,5-dicarboxyphenylazo) naphthalene

5-Aminoisophthalic acid (18.1 g, 0.1M) was diazotized by the method of Example 1.

1-Naphthylamine (14.3 g, 0.1M) was dissolved in water (300 ml) and 36% HCl (15 ml) at 70° C. and cooled to room temperature. The resulting suspension was added to the above diazo suspension at 10° C. and the pH adjusted to 4.5 by the addition of sodium acetate.

The mixture was stirred for 18 hours and the dye collected by filtration and washed with water (100 ml).

Stage 2:

The paste from Stage 1 (0.1M) was then reacted with Gamma acid by the method of Example 1, Stage 2. The product was 1-hydroxy-2-(4-[3,5-dicarboxyphenylazo]-naphth-1-ylazo-3-sulpho-7-aminonaphthalene.

Specific inks according to this invention were formulated using the following dyes:

| Dye | X | Y | Z | R | Salt |
|---|---|---|---|---|---|
| 1 | COOH | SO$_3$H | H | H | NH$_4$ |
| 2 | COOH | H | H | H | Na + NH$_4$ |
| 3 | COOH | COOH | H | H | NH$_4$ |

EXAMPLE 3

2.5 wt.% Dye 1 (ammonium salt) was dissolved in aqueous solutions containing diethylene glycol (DEG), ethylene glycol (EG), N-methyl-2-pyrrolidone, N-(2-hydroxyethyl)-2-pyrrolidone, 2-pyrrolidone, and urea (UR). These solutions were printed on bond paper by means of a Hewlett-Packard DeskJet printer, (DeskJet is a trademark of Hewlett-Packard Company) with the following restuls:

| Ink Name | Solvent % | L | ΔL | ΔB | ΔE | alk 1-p | acid 1-p | ktp | pH |
|---|---|---|---|---|---|---|---|---|---|
| DEG-1 | 2 | 30.8 | −0.9 | −11.3 | 11.9 | 317 | 63 | 183 | 8.3 |
| DEG-2 | 5 | 30.2 | −0.3 | −5.9 | 6 | 223 | 38 | 83 | 8.3 |
| DEG-3 | 10 | 32.7 | −0.8 | −11.5 | 11.8 | 306 | 38 | 147 | 8.4 |
| DEG-4 | 15 | 31.7 | −0.07 | −11.1 | 11.5 | 247 | 46 | 159 | 8.4 |
| EG-1 | 2 | 30.8 | −1.3 | −11.6 | 12.2 | 370 | 66 | 163 | 8.3 |
| EG-2 | 5 | 31.3 | −1.4 | −13.1 | 13.7 | 305 | 53 | 170 | 8.5 |
| EG-3 | 10 | 30.9 | −0.5 | −11.3 | 11.8 | 332 | 21 | 128 | 8.5 |
| EG-4 | 15 | 31.4 | −2 | −14.8 | 15.4 | 251 | 61 | 132 | 8.5 |
| NMP-1 | 2 | 28.8 | 1.8 | −7.5 | 8.1 | 81 | 48 | 107 | 8.4 |
| NMP-2 | 5 | 29.7 | −0.4 | −9.1 | 9.3 | 117 | 40 | 119 | 8.3 |
| NMP-3 | 10 | 30 | −0.1 | −9.1 | 9.3 | 90 | 63 | 95 | 8.4 |
| NMP-4 | 15 | 30.5 | −1 | −8.8 | 9 | 58 | 53 | 97 | 8.4 |
| HEP-1 | 2 | 29.3 | −1.2 | −7.4 | 7.8 | 183 | 43 | 157 | 8.6 |
| HEP-2 | 5 | 29.2 | −0.5 | −7.3 | 7.6 | 134 | 42 | 120 | 8.7 |
| HEP-3 | 10 | 28.9 | 0.9 | −4.6 | 4.8 | 134 | 39 | 86 | 8.8 |
| HEP-4 | 15 | 27.8 | 1.9 | −3.3 | 3.8 | 154 | 44 | 69 | 8.9 |
| 2P-1 | 2 | 29.7 | −0.4 | −7.7 | 8 | 127 | 35 | 161 | 8.4 |
| 2P-2 | 5 | 29.5 | −1.3 | −8.3 | 8.7 | 141 | 42 | 142 | 8.4 |
| 2P-3 | 10 | 29.7 | −0.6 | −6.6 | 6.8 | 99 | 28 | 82 | 8.4 |
| 2P-4 | 15 | 30.4 | −0.2 | −6.9 | 7 | 105 | 52 | 66 | 8.4 |
| UR-1 | 2 | 31.5 | 0.7 | −7.7 | 8.1 | 161 | 41 | 121 | 8.4 |
| UR-2 | 5 | 28 | −1 | −7.6 | 7.9 | 80 | 35 | 130 | 8.4 |
| UR-3 | 10 | 27.4 | −0.3 | −4.4 | 4.6 | 61 | 21 | 93 | 8.5 |
| UR-4 | 15 | 26.4 | 0.5 | −3.4 | 3.6 | 69 | 21 | 88 | 8.5 |

ΔL is a measure of the difference in darkness of the print before and after washing. If ΔL is 0, there is no change. If a positive value is set out, then the washed sample has lost darkness; if a negative value is set forth, then the print got darker after washing due to smearing of the dots to fill in uninked or lightly inked areas.

ΔE is the vector difference between colors of unwashed and washed prints, i.e., a change in hue. If the change is very bad, it has a ΔE of about 50. If it is hardly noticeable, it is rated as having a ΔE of about 5.

ΔB is designed to measure the loss of "blackness" or optical density. These dyes have small or negative values. However, when the actual print samples are closely examined, a color change (hue shift) is noticed due to immersion in water.

Tests headed "alk 1-p" and "acid 1-p" are measures of dye smearing by one pass of an alkaline or acidic highlighter, respectively. The smaller the number, the less smearing.

The "ktp" test measures the amount of dye transferred from the printed area to the unprinted area when water is dripped across a print sample held at a 45° angle and subsequently dried.

EXAMPLE 4

The preceding tests were repeated using inks that contain 2.5 wt.% of the sodium or ammonium salt of Dye 2. The results were as follows:

| | | Dye 2 (Na salt) | | |
|---|---|---|---|---|
| Ink Name | % Sol. | L | ΔL | ΔB | ΔE |
| DEG-1 | 2 | 27.6 | 10.7 | −10.9 | 15.3 |
| DEG-2 | 5 | 27.4 | 8.2 | 11.4 | 14.1 |
| DEG-3 | 10 | 24.8 | 7.9 | −8.3 | 11.5 |
| DEG-4 | 15 | 25.1 | 6.1 | −5.6 | 8.3 |
| EG-1 | 2 | 29.9 | 12 | −13.2 | 17.9 |
| EG-2 | 5 | 28.3 | 9.5 | −12 | 15.3 |
| EG-3 | 10 | 26.2 | 10.1 | −10 | 14.2 |
| EG-4 | 15 | 25.5 | 8.7 | −8.3 | 12 |
| NMP-1 | 2 | 25.9 | 8.9 | −8.4 | 12.3 |
| NMP-2 | 5 | 24.6 | 8.3 | −7.6 | 11.3 |
| NMP-3 | 10 | 24.3 | 7.8 | −5.6 | 9.9 |
| NMP-4 | 15 | 24.5 | 7.3 | −5.4 | 9.1 |
| HEP-1 | 2 | 26.4 | 15.3 | −12.4 | 19.9 |
| HEP-2 | 5 | 24.5 | 9 | −7.6 | 12.1 |

| | | -continued | | | |
|---|---|---|---|---|---|
| HEP-3 | 10 | 23.5 | 11.9 | −8.1 | 14.6 |
| HEP-4 | 15 | 23.8 | 9.9 | −6.8 | 12.7 |
| 2P-1 | 2 | 26.6 | 9.1 | −10.2 | 13.7 |
| 2P-2 | 5 | 24.7 | 7.4 | −7.6 | 10.6 |
| 2P-3 | 10 | 24.6 | 7.2 | −6.2 | 9.6 |
| 2P-4 | 15 | 25.6 | 6.1 | −3.9 | 7.4 |
| UR-1 | 2 | 27.6 | 8.9 | −10.6 | 13.9 |
| UR-2 | 5 | 25.7 | 8.2 | −8.8 | 12 |
| UR-3 | 10 | 24.7 | 9.8 | −8.8 | 13.2 |
| UR-4 | 15 | 24.2 | 9.4 | −8.3 | 12.6 |

Dye 2 (NH₄ salt)

| Name Ink Name | Sol % | Cr/sec | L | ΔL | ΔB | ΔE | alk 1-p | acid 1-p | ktp |
|---|---|---|---|---|---|---|---|---|---|
| DEG-1 | 2 | <300 | 25.9 | 1 | −5.3 | 5.6 | 312 | 11 | 106 |
| DEG-2 | 5 | <300 | 26.3 | 0.2 | −5.4 | 5.6 | 184 | 33 | 81 |
| DEG-3 | 10 | <300 | 29.6 | −2.4 | −8.4 | 8.5 | 309 | 33 | 88 |
| DEG-4 | 15 | >420 | 30.7 | −0.9 | −8 2 | 8.5 | 333 | 70 | 37 |
| EG-1 | 2 | <300 | 27.4 | 3.1 | −5.5 | 6.4 | 135 | 25 | 118 |
| EG-2 | 5 | <300 | 25.2 | 4.9 | 6.3 | 8 | 89 | 5 | 156 |
| EG-3 | 10 | >300 | 26.5 | −0.7 | 6.7 | 7 | 154 | 70 | 10 |
| EG-4 | 15 | >480 | 27.7 | −0.9 | 8.1 | 8.5 | 108 | 51 | 79 |
| NMP-1 | 2 | <300 | 26.6 | −0.7 | −6.2 | 6 5 | 185 | 19 | 107 |
| NMP-2 | 5 | <300 | 25.8 | 0.1 | −5 | 5.1 | 90 | 10 | 106 |
| NMP-3 | 10 | <300 | 28.8 | −1.8 | −7.2 | 7.6 | 187 | 33 | 73 |
| NMP-4 | 15 | <300 | 30.4 | 0.4 | −6.2 | 6.2 | 135 | 37 | 15 |
| HEP-1 | 2 | <300 | 27.3 | 2.9 | −4.1 | 5.1 | 290 | 38 | 110 |
| HEP-2 | 5 | <300 | 25.9 | 0.01 | −4.7 | 4.8 | 283 | 20 | 100 |
| HEP-3 | 10 | >420 | 27.7 | 0.8 | −3.4 | 3.5 | 105 | 19 | 46 |
| HEP-4 | 15 | >600 | 29.1 | 1.1 | −1 | 1.7 | 152 | 33 | 24 |
| 2P-1 | 2 | <300 | 25.6 | 0.4 | −4.6 | 4.8 | 208 | 19 | 58 |
| 2P-2 | 5 | <300 | 27 | −0.6 | −4.1 | 4.2 | 205 | 22 | 91 |
| 2P-3 | 10 | <300 | 29.6 | −2.4 | −7.4 | 8.1 | 227 | 29 | 58 |
| 2P-4 | 15 | >300 | 29.7 | −0.8 | −3.8 | 4 | 190 | 32 | 31 |

"Cr/sec" is the time in seconds which it takes before there is a misdirected drop due to short term standing outside the "home position" of the pen.

When a user plots a long graphics routine on a printer such as a DeskJet printer, the pen is out of the "home position" for an extended period of time. During this time, some nozzles may not fire at all, and the ink in these nozzles can become concentrated due to water evaporation. This can cause precipitation of the dye and crusting at the nozzles, resulting in the next drop fired from such a nozzle to be misdirected.

EXAMPLE 5

2 wt% of the ammonium form of Dye 3 was dissolved in 10% organic solvent and water. The inks had pHs in the range of 7 to 9. Ink-jet prints of these inks were tested with the following results:

| Solvent | L | ΔL | ΔB | ΔE | alk-1p | ktp |
|---|---|---|---|---|---|---|
| DEG | 29.9 | 1.3 | −5.8 | 6.0 | 119 | 116 |
| EG | 31.4 | 1.8 | −7.2 | 7.6 | 96 | 118 |
| NMP | 27.3 | 2.3 | −4.2 | 4.8 | 74 | 109 |
| HEP | 25.8 | 2.1 | −3.8 | 4.4 | 21 | 122 |
| 2-P | 28.2 | 2.1 | −5.0 | 5.5 | 32 | 48 |
| UR | 29.0 | 1.7 | −6.5 | 6.7 | 38 | 103 |

EXAMPLE 6

Gilbert Bond papers were printed, using a Deskjet printer and inks of the following formulations (weight %):

| 2.2% Dye 1 | 2.2% Dye 2 |
|---|---|
| 10% 2-Pyrrolidone | 10% 2-Pyrrolidone |
| 0.2% sodium borate | 0.2% sodium borate |

| -continued | |
|---|---|
| balance water | balance water |

Good prints were obtained.

INDUSTRIAL APPLICABILITY

The inks of this invention can be used to print a wide range of papers, especially uncoated papers, using a thermal ink-jet printer.

I claim:
1. An ink comprising, by wt%:
   (a) from about 0.5% to about 20% dye which, in the free acid state, corresponds to the formula

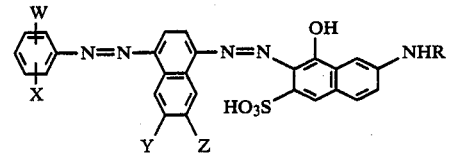

wherein
   W is COOH,
   X is H or COOH,
   Y is H, COOH, or SO₃H,
   Z is H, COOH, or SO₃H, and
   R is H, CH₂COOH, or CH₂CH₂COOH;
provided that there are at least two COOH groups and that the number of COOH groups is equal to or greater than the number of SO₃ groups,
   (b) up to about 30% of a water soluble organic solvent for said dye, and
   (c) water.

2. An ink of claim 1 wherein the dye is present in the form of its alkali metal salt, its ammonium or substituted ammonium salt.

3. An ink of claim 2 wherein the alkali metal is Na, K, or Li.

4. An ink of claim 3 wherein the ammonium and substituted ammonium salt is $NH_4$, $(CH_3)_4N$, $(CH_3)_3NH$, $(CH_3)_2NH_2$, and $CH_3NH_3$, 5. An ink of cliam 2 wherein there are at least two COOH groups attached directly to aromatic carbon atoms.

6. An ink of claim 2 wherein W is in the para position with respect to the azo group when X is H.

7. An ink of cliam 2 wherein X is COOH and X and W are in the 3,5-, 3,4-, or 2,5- position with respect to the azo group.

8. An ink of claim 2 wherein there are more COOH groups than $SO_3H$ groups.

9. An ink of claim 2 having a pH from about 7 to about 9.5.

10. An ink of claim 2 wherien there is present a salt which has a volatile cation.

11. An ink of claim 2 wherein there is present an ammonium salt.

12. An ink of claim 11 wherein the salt is ammonium acetate.

13. An ink comprising, by wt%:
(a) from about 1% to about 10% dye corresponding to the formula

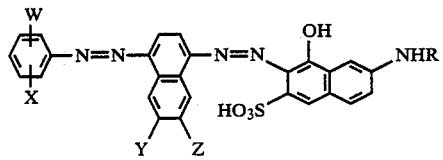

wherein
W is COOH,
X is H, or COOH,
Y is H, COOH, or $SO_3H$,
Z is H, COOH, or $SO_3H$, and
R is H, $CH_2COOH$, or $CH_2CH_2COOH$;
provided that there are at least two COOH groups and that the number of COOH groups is equal to or greater than the number of $SO_3$ groups,
(b) water, and
(c) and sufficient buffer to maintain the ink at a pH from about 7 to about 9.5.

14. An ink comprising, by wt%:
(a) from about 1% to about 10% dye corresponding to the following formula

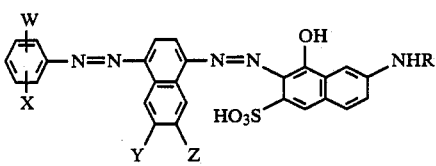

wherein
W is COOH,
X is H, or COOH,
Y is H, COOH, or $SO_3H$,
Z is H, COOH, or $SO_3H$, and
R is H, $CH_2COOH$, or $CH_2CH_2COOH$;
provided that there are at least two COOH groups and that the number of COOH groups is equal to or greater than the number of $SO_3$ groups,
(b) about 2% to about 30% water-soluble organic solvent,
(c) water, and
(d) and sufficient buffer to maintain the ink at a pH from about 7 to about 9.5.

15. An ink of claim 14 wherein the water-soluble organic solvent is an alkanol having from 1 to 4 carbon atoms, an amide, a ketone, a ketone alcohol, an ether, a nitrogen containing heterocyclic ketone, a polyalkylene glycol, an alkylene glycol, an alkylene thioglycol, thiodiglycol, hexylene glycol, diethylene glycol, a polyol, and a lower alkyl ether of a polyhydric alcohol.

16. An ink of claim 15 wherein the organic solvent is diethylene glycol.

17. An ink of claim 15 wherein the organic solvent is 2-pyrrolidone.

* * * * *